the invention relates to a polyamide moulding compound

(12) United States Patent
Bühler

(10) Patent No.: US 9,109,115 B2
(45) Date of Patent: Aug. 18, 2015

(54) POLYAMIDE MOULDING COMPOUND AND MOULDED ARTICLES PRODUCED HEREFROM

(71) Applicants: EMS-PATENT AG, Domat/Ems (CH); Magdalena Dieterle-Bühler, Thusis (CH)

(72) Inventor: Friedrich Severin Bühler, Thusis (CH)

(73) Assignee: EMS-Patent AG, Domat/Ems (CH)

( * ) Notice: Subject to any disclaimer, the term of this patent is extended or adjusted under 35 U.S.C. 154(b) by 0 days.

(21) Appl. No.: 14/205,667

(22) Filed: Mar. 12, 2014

(65) Prior Publication Data
US 2014/0275392 A1 Sep. 18, 2014

(30) Foreign Application Priority Data
Mar. 15, 2013 (EP) .................................... 13159541

(51) Int. Cl.
*C08L 77/06* (2006.01)
*C08G 69/26* (2006.01)
*C08L 51/04* (2006.01)

(52) U.S. Cl.
CPC .................. *C08L 77/06* (2013.01); *C08G 69/26* (2013.01); *C08L 51/04* (2013.01)

(58) Field of Classification Search
CPC . C08L 77/06; C08L 23/0815; C08L 23/0838; C08G 69/26
USPC ......................................... 428/35.7; 524/505
See application file for complete search history.

(56) References Cited

U.S. PATENT DOCUMENTS

| | | |
|---|---|---|
| 2,516,585 A | 7/1950 | Pease |
| 3,454,536 A | 7/1969 | Schade et al. |
| 3,551,064 A | 12/1970 | Bartner |
| 3,600,336 A | 8/1971 | Okada et al. |
| 3,625,788 A | 12/1971 | Bartner |
| 3,721,653 A * | 3/1973 | Campbell ..................... 528/340 |
| 4,036,811 A | 7/1977 | Noetzel et al. |
| 4,076,664 A | 2/1978 | Pagilagan |
| 4,212,777 A | 7/1980 | Goletto |
| 4,322,260 A | 3/1982 | Conlon |
| 4,345,066 A | 8/1982 | Rüter |
| 4,413,921 A | 11/1983 | Fotiu et al. |
| 4,537,949 A | 8/1985 | Schmidt et al. |
| 4,540,772 A | 9/1985 | Pipper et al. |
| 4,603,166 A | 7/1986 | Poppe et al. |
| 4,607,073 A | 8/1986 | Sakashita et al. |
| 4,617,342 A | 10/1986 | Poppe et al. |
| 4,680,379 A | 7/1987 | Coquard et al. |
| 4,731,421 A | 3/1988 | Hoppe et al. |
| 4,826,951 A | 5/1989 | Coquard et al. |
| 4,831,106 A | 5/1989 | Kempter et al. |
| 4,831,108 A | 5/1989 | Richardson et al. |
| 4,847,356 A | 7/1989 | Hoppe et al. |
| 5,071,924 A | 12/1991 | Koch et al. |
| 5,081,222 A | 1/1992 | Reimann et al. |
| 5,098,940 A | 3/1992 | Brooks |
| 5,177,177 A | 1/1993 | Thullen et al. |
| 5,177,178 A | 1/1993 | Thullen et al. |
| 5,191,060 A | 3/1993 | Akkapeddi et al. |
| RE34,447 E | 11/1993 | Poppe et al. |
| 5,278,231 A | 1/1994 | Chundury |
| 5,302,691 A | 4/1994 | Soelch |
| 5,310,860 A | 5/1994 | Maj et al. |
| 5,342,862 A | 8/1994 | Reich |
| 5,422,418 A | 6/1995 | Maj et al. |
| 5,480,945 A | 1/1996 | Vicik |
| 5,560,398 A | 10/1996 | Pfleger |

(Continued)

FOREIGN PATENT DOCUMENTS

| | | |
|---|---|---|
| CA | 861620 | 1/1971 |
| CA | 1109619 A1 | 9/1981 |

(Continued)

OTHER PUBLICATIONS

"BIAX, ein neuer Prüfkörper" (BIAX, a new inspection piece), published in Noss'Ovra staff magazine, Dec. 2006, No. 12, 29th year, EMS-CHEMIE AG (4 pgs.).
Cramer et al., "Some Isomorphous Copolyamides," *Journal of Polymer Science*, vol. 21, pp. 237-250 (1956).
Dolden, "Structure-property relationships in amorphous polyamides," *Polymer*, vol. 17, pp. 875-892 (1976).
Edgar et al., "The p-Phenylene Linkage in Linear High Polymers: Some Structure-Property Relationships," *Journal of Polymer Science*, vol. 8, No. 1, pp. 1-22 (1952).
Henkel Corporation, "Empol Dimer and Polybasic Acids: Technical Bulletin 114C," (1997).
Laura et al., "Effect of rubber particle size and rubber type on the mechanical properties of glass fiber reinforced, rubber-toughened nylon 6," *Polymer*, vol. 44, No. 11, pp. 3347-3361 (2003).
Levine et al., "Isomorphous Replacement in a Copolyamide System," *Journal of Polymer Science*, Issue XLIX, pp. 241-246 (1961).

(Continued)

*Primary Examiner* — James J Seidleck
*Assistant Examiner* — Deve E Valdez
(74) *Attorney, Agent, or Firm* — Leydig, Voit & Mayer, Ltd.

(57) ABSTRACT

The invention relates to a polyamide moulding compound made of a polyamide (PA MACM12) made of bis(3-methyl-4-aminocyclohexyl)methane (MACM) and dodecanedioic acid, a polyamide (PA PACM12) made of bis(4-aminocyclohexyl)methane (PACM) and dodecanedioic acid, a polyamide (PA MACM10) made of bis(3-methyl-4-aminocyclohexyl) methane and decanedioic acid, a polyamide (PA PACM10) made of bis(4-aminocyclohexyl)methane and decanedioic acid, a polyamide (PA MACM14) made of bis(3-methyl-4-aminocyclohexyl)methane and tetradecanedioic acid, a polyamide (PA PACM14) made of (bis(4-aminocyclohexyl) methane and tetradecanedioic acid and also mixtures and copolyamides thereof. Furthermore, the moulding compound comprises as impact modifier a functionalised styrene-ethylene/butylene-styrene block copolymer and also possibly further additives. Likewise, the invention relates to moulded articles produced from this polyamide moulding compound.

20 Claims, No Drawings

(56) References Cited

U.S. PATENT DOCUMENTS

| | | |
|---|---|---|
| 5,612,446 A | 3/1997 | Presenz et al. |
| 5,674,973 A | 10/1997 | Pipper et al. |
| 5,684,120 A | 11/1997 | Torre |
| 5,686,192 A | 11/1997 | Presenz et al. |
| 5,688,901 A | 11/1997 | Fisch et al. |
| 5,708,125 A | 1/1998 | Liedloff et al. |
| 5,773,556 A | 6/1998 | Kleiner et al. |
| 5,786,086 A | 7/1998 | Frihart et al. |
| 5,807,972 A | 9/1998 | Liedloff et al. |
| 5,917,004 A | 6/1999 | Liedloff et al. |
| 5,957,607 A | 9/1999 | Tsai |
| 6,008,288 A | 12/1999 | Dalla Torre |
| 6,204,355 B1 | 3/2001 | Dalla Torre et al. |
| 6,255,371 B1 | 7/2001 | Schlosser et al. |
| 6,270,560 B1 | 8/2001 | Kleiner et al. |
| 6,291,633 B1 | 9/2001 | Nakamura |
| 6,303,741 B1 | 10/2001 | Tanaka |
| 6,319,986 B1 | 11/2001 | Amimoto et al. |
| 6,365,071 B1 | 4/2002 | Jenewein et al. |
| 6,547,992 B1 | 4/2003 | Schlosser et al. |
| 6,572,295 B1 | 6/2003 | Chochoy et al. |
| 6,706,790 B1 | 3/2004 | Berliet |
| 6,881,477 B2 | 4/2005 | Presenz et al. |
| 6,943,231 B2 | 9/2005 | Bühler |
| 7,014,315 B2 | 3/2006 | Iori et al. |
| 7,217,767 B2 | 5/2007 | Aguirre et al. |
| 7,249,844 B2 | 7/2007 | Sakai |
| 7,258,929 B2 | 8/2007 | Kanda et al. |
| 7,427,430 B2 | 9/2008 | Rhee et al. |
| 7,723,411 B2 | 5/2010 | Schneider |
| 7,807,245 B2 | 10/2010 | Bersted et al. |
| 7,807,742 B2 | 10/2010 | Tanaka et al. |
| 7,811,671 B2 | 10/2010 | Bushelman et al. |
| 7,981,518 B2 | 7/2011 | Sato |
| 8,022,170 B2 | 9/2011 | Hoffmann et al. |
| 8,268,956 B2 | 9/2012 | Bühler et al. |
| 8,383,244 B2 | 2/2013 | Bayer et al. |
| 8,507,598 B2 | 8/2013 | Bühler et al. |
| 2001/0007888 A1 | 7/2001 | Asano |
| 2003/0018107 A1 | 1/2003 | Heinen et al. |
| 2003/0023008 A1 | 1/2003 | Uchida et al. |
| 2003/0126788 A1 | 7/2003 | Uang et al. |
| 2003/0130381 A1 | 7/2003 | Joachimi et al. |
| 2003/0181585 A1 | 9/2003 | Handlin, Jr. et al. |
| 2003/0235666 A1 | 12/2003 | Bühler |
| 2004/158028 A1 | 8/2004 | Bühler |
| 2004/0230028 A1 | 11/2004 | Sato et al. |
| 2004/0242803 A1 | 12/2004 | Ohme et al. |
| 2005/0049339 A1 | 3/2005 | Knop et al. |
| 2005/0101708 A1 | 5/2005 | Knop et al. |
| 2006/0138391 A1 | 6/2006 | Drewes et al. |
| 2006/0235190 A1 | 10/2006 | Hoffmann et al. |
| 2006/0264542 A1 | 11/2006 | Schneider |
| 2007/0072970 A1 | 3/2007 | Schneider |
| 2007/0104971 A1 | 5/2007 | Wursche et al. |
| 2007/0123632 A1 | 5/2007 | Rexin et al. |
| 2007/0172614 A1 | 7/2007 | Lee |
| 2007/0222941 A1 | 9/2007 | Sakai |
| 2007/0270544 A1 | 11/2007 | Bühler et al. |
| 2008/0135720 A1 | 6/2008 | Bühler et al. |
| 2008/0167415 A1 | 7/2008 | Stoeppelmann et al. |
| 2008/0207782 A1 | 8/2008 | Jacobs et al. |
| 2008/0274355 A1 | 11/2008 | Hewel |
| 2009/0127740 A1 | 5/2009 | Kirchner |
| 2009/0131569 A1 | 5/2009 | Schwitter et al. |
| 2009/0163634 A1 | 6/2009 | Bühler et al. |
| 2009/0247699 A1 | 10/2009 | Buehler et al. |
| 2010/0022742 A1 | 1/2010 | Bühler et al. |
| 2010/0028646 A1 | 2/2010 | Schwitter et al. |
| 2010/0036043 A1* | 2/2010 | Weber et al. .................. 524/504 |
| 2010/0130677 A1 | 5/2010 | Amici et al. |
| 2010/0227122 A1 | 9/2010 | Kumazawa et al. |
| 2010/0279111 A1 | 11/2010 | Philipp et al. |
| 2010/0297373 A1 | 11/2010 | Thullen et al. |
| 2010/0311882 A1 | 12/2010 | Eibeck et al. |
| 2011/0105655 A1 | 5/2011 | Harder et al. |
| 2011/0220667 A1 | 9/2011 | Pfleghar et al. |
| 2012/0029133 A1 | 2/2012 | Stoppelmann et al. |
| 2012/0237708 A1 | 9/2012 | Caviezel et al. |
| 2012/0321829 A1 | 12/2012 | Bayer et al. |
| 2013/0317168 A1 | 11/2013 | Bühler |
| 2014/0094548 A1 | 4/2014 | Roth et al. |
| 2014/0171573 A1 | 6/2014 | Bayer et al. |

FOREIGN PATENT DOCUMENTS

| | | |
|---|---|---|
| CA | 2019904 | 1/1991 |
| CH | 280367 | 1/1952 |
| CN | 1167267 A | 12/1997 |
| CN | 101357515 A | 2/2009 |
| CN | 201741455 U | 2/2011 |
| DE | 14 95 393 | 4/1969 |
| DE | 24 47 727 A1 | 4/1976 |
| DE | 26 42 244 A1 | 3/1977 |
| DE | 2821333 A1 | 11/1978 |
| DE | 36 00 015 A1 | 7/1986 |
| DE | 90 01 242 U1 | 2/1991 |
| DE | 40 05 894 A1 | 12/1991 |
| DE | 43 29 676 A1 | 3/1994 |
| DE | 195 13 940 A1 | 1/1996 |
| DE | 195 37 614 A1 | 4/1997 |
| DE | 199 20 276 A1 | 11/2000 |
| DE | 199 33 901 A1 | 2/2001 |
| DE | 102 24 947 A1 | 12/2003 |
| DE | 102 59 048 A1 | 7/2004 |
| DE | 696 32 529 T2 | 9/2004 |
| DE | 103 16 873 A1 | 11/2004 |
| DE | 103 46 326 A1 | 5/2005 |
| DE | 694 28 832 T3 | 2/2007 |
| DE | 102010023770 A1 | 12/2011 |
| EP | 0 052 944 A1 | 6/1982 |
| EP | 0 129 195 A2 | 12/1984 |
| EP | 0 129 196 A2 | 12/1984 |
| EP | 0 196 981 A1 | 10/1986 |
| EP | 0 246 620 A2 | 11/1987 |
| EP | 0 288 269 A1 | 10/1988 |
| EP | 0 299 444 A2 | 1/1989 |
| EP | 0 325 923 A2 | 8/1989 |
| EP | 0 360 611 A2 | 3/1990 |
| EP | 0 376 616 B1 | 7/1990 |
| EP | 0 410 301 A1 | 1/1991 |
| EP | 0 449 466 A1 | 10/1991 |
| EP | 0 469 435 A1 | 2/1992 |
| EP | 0 508 054 A2 | 10/1992 |
| EP | 0 550 314 A1 | 7/1993 |
| EP | 0 550 315 A1 | 7/1993 |
| EP | 0 659 534 A2 | 6/1995 |
| EP | 0 693 515 A1 | 1/1996 |
| EP | 0 699 708 A2 | 3/1996 |
| EP | 0 725 101 A1 | 8/1996 |
| EP | 0 792 912 A2 | 9/1997 |
| EP | 0 796 886 A2 | 9/1997 |
| EP | 0 818 491 A2 | 1/1998 |
| EP | 0 725 100 B1 | 3/1998 |
| EP | 0 837 087 A1 | 4/1998 |
| EP | 0 839 862 A1 | 5/1998 |
| EP | 0 976 774 A2 | 2/2000 |
| EP | 0 771 846 B1 | 1/2002 |
| EP | 1 339 096 A2 | 8/2003 |
| EP | 1 369 447 A1 | 12/2003 |
| EP | 1 475 403 A1 | 11/2004 |
| EP | 1 548 059 A1 | 6/2005 |
| EP | 1 630 590 A1 | 3/2006 |
| EP | 1 712 581 A1 | 10/2006 |
| EP | 1 752 492 A1 | 2/2007 |
| EP | 1 845 123 A1 | 10/2007 |
| EP | 1 942 296 A1 | 7/2008 |
| EP | 1 972 659 A1 | 9/2008 |
| EP | 2 060 596 A1 | 5/2009 |
| EP | 2 060 607 A1 | 5/2009 |
| EP | 2 082 861 A1 | 7/2009 |
| EP | 1 474 459 B1 | 11/2009 |
| EP | 2 365 033 A1 | 9/2011 |
| EP | 2 412 757 A1 | 2/2012 |

(56) References Cited

FOREIGN PATENT DOCUMENTS

| | | |
|---|---|---|
| EP | 2 535 365 A1 | 12/2012 |
| GB | 766927 | 1/1957 |
| GB | 1 538 188 A | 1/1979 |
| GB | 1548431 | 7/1979 |
| JP | 54-071191 A | 6/1979 |
| JP | 61-200125 A | 9/1986 |
| JP | 63-023927 A | 2/1988 |
| JP | 02-302440 A | 12/1990 |
| JP | 03-050264 A | 3/1991 |
| JP | H05-043799 A | 2/1993 |
| JP | 05-125184 A | 5/1993 |
| JP | 06-511281 T | 12/1994 |
| JP | 08-239469 A | 8/1996 |
| JP | 08-259808 A | 10/1996 |
| JP | 09-078351 A | 3/1997 |
| JP | 10-168183 A | 6/1998 |
| JP | 10-219026 | 8/1998 |
| JP | 2000-204239 A | 7/2000 |
| JP | 2001-261973 | 9/2001 |
| JP | 2004-083858 | 3/2004 |
| JP | 2006-045390 | 2/2006 |
| JP | 2009-132908 A | 6/2009 |
| JP | 2009-149896 A | 7/2009 |
| WO | WO 90/02017 A1 | 3/1990 |
| WO | WO 92/01389 A1 | 2/1992 |
| WO | WO 92/10525 A1 | 6/1992 |
| WO | WO 94/29367 A1 | 12/1994 |
| WO | WO 95/01389 A1 | 1/1995 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |
| WO | WO 02/090421 A2 | 11/2002 |
| WO | WO 2004/055084 A2 | 7/2004 |
| WO | WO 2004/078848 A1 | 9/2004 |
| WO | WO 2004/090036 A1 | 10/2004 |
| WO | WO 2005/035664 A1 | 4/2005 |
| WO | WO 2006/074934 A1 | 7/2006 |
| WO | WO 2006/122602 A1 | 11/2006 |
| WO | WO 2007/080754 A1 | 7/2007 |
| WO | WO 2007/087896 A1 | 8/2007 |
| WO | WO 2009/062692 A2 | 5/2009 |
| WO | WO 2009/095440 A1 | 8/2009 |
| WO | WO 2009/156323 A2 | 12/2009 |
| WO | WO 2012/168442 A1 | 12/2012 |
| WO | WO 2013/163012 A1 | 10/2013 |
| WO | WO 2013/188302 A1 | 12/2013 |
| WO | WO 2013/188323 A1 | 12/2013 |
| WO | WO 2013/188488 A1 | 12/2013 |

OTHER PUBLICATIONS

Unichema International, "Pripol C36-Dimer Acid," (published prior to Dec. 17, 2003—exact date unknown).

Yu et al., "Isomorphous Replacement in a Copolyamide System: Homologs of Adipic and Terephthalic Acids," *Am. Chem. Soc.*, Issue 81, pp. 5361-5365 (1959).

European Patent Office, Extended European Search Report in European Patent Application No. 13159541.5 (Jul. 29, 2013).

* cited by examiner

POLYAMIDE MOULDING COMPOUND AND MOULDED ARTICLES PRODUCED HEREFROM

CROSS-REFERENCE TO A RELATED APPLICATION

This application claims the benefit of European Patent Application No. 13159541.5, filed Mar. 15, 2013, the disclosure of which is incorporated herein by reference.

The invention relates to a polyamide moulding compound made of a polyamide (PA MACM12) made of bis(3-methyl-4-aminocyclohexyl)methane (MACM) and dodecanedioic acid, a polyamide (PA PACM12) made of bis(4-aminocyclohexyl)methane (PACM) and dodecanedioic acid, a polyamide (PA MACM10) made of bis(3-methyl-4-aminocyclohexyl) methane and decanedioic acid, a polyamide (PA PACM10) made of bis(4-aminocyclohexyl)methane (PACM) and decanedioic acid, a polyamide (PA MACM14) made of bis (3-methyl-4-aminocyclohexyl)methane (MACM) and tetradecanedioic acid, a polyamide (PA PACM14) made of (bis (4-aminocyclohexyl)methane (PACM) and tetradecanedioic acid and also mixtures and copolyamides thereof. Furthermore, the moulding compound comprises as impact modifier a functionalised styrene-ethylene/butylene-styrene block copolymer and also possibly further additives. Likewise, the invention relates to moulded articles produced from this polyamide moulding compound.

In the field of transparent polyamides with high light-permeability, two types of polymer are known, amorphous ones which have only a glass transition temperature and microcrystalline ones which have a glass transition temperature and a melting point. There are termed as amorphous, polyamides which show in dynamic differential calorimetry (differential scanning calorimetry, DSC) according to ISO 11357 at a heating rate of 20 K/min, a melting heat of at most 3 J/g, preferably at most 1 J/g.

From EP-A-O 725 101, amorphous, transparent polyamide moulding compounds with high chemical and thermal resistance and excellent dynamic loadability relative to fatigue loading are known, which are constructed from MACM (bis-(4-amino-3-methyl-cyclohexyl)-methane) and dodecanedioic acid. Impact modifiers as possible additives are only mentioned in general in EP-A-O 725 101.

Transparent polyamide moulding compounds which are based on mixtures of PACM and MACM and have improved transparency are known from EP 1 369 447 A1. There are mentioned as possible additives, inter alia, impact modifiers, ethylene-glycidyl-methacrylate or polyethylene or polypropylene grafted with maleic acid anhydride being preferred.

Starting herefrom, it was the object of the present invention to provide impact-modified polyamide moulding compounds which are improved both with respect to the mechanical and to the optical properties relative to the state of the art. With respect to the optical properties, this relates in particular to minimising the opacity (haze) and maximising the transmission of the moulded articles produced from the impact-modified polyamide moulding compound according to the invention.

This object is achieved by the features of the polyamide moulding compound and the moulded articles described herein, and the advantageous developments thereof. Uses according to the invention are also described.

According to the present invention, a polyamide moulding compound is provided, which comprises the following components:

a) 82 to 96% by weight, relative to the sum of components a) to c), of at least one polyamide selected from the group consisting of polyamide (PA MACM12) made of bis(3-methyl-4-aminocyclohexyl)methane and dodecanedioic acid,
polyamide (PA PACM12) made of bis(4-aminocyclohexyl)methane and dodecanedioic acid,
polyamide (PA MACM10) made of bis(3-methyl-4-aminocyclohexyl)methane (MACM) and decanedioic acid,
polyamide (PA PACM10) made of bis(4-aminocyclohexyl)methane (PACM) and decanedioic acid,
polyamide (PA MACM14) made of bis(3-methyl-4-aminocyclohexyl)methane (MACM) and tetradecanedioic acid,
polyamide (PA PACM14) made of bis(4-aminocyclohexyl)methane (PACM) and tetradecanedioic acid and also
mixtures and copolyamides thereof, b) 4 to 18% by weight, relative to the sum of components a) to c), of a functionalised styrene-ethylene/butylene-styrene block copolymer as impact modifier and also c) 0 to 8% by weight, relative to the sum of components a) to c), of further additives, components a) to c) adding up to 100% by weight.

The polyamide moulding compound can basically comprise further components but preferably consists of components a) to c).

The combination of the mentioned polyamides with the impact modifier according to the invention led to moulded articles with improved mechanical properties, surprisingly also the optical properties being, at the same time, virtually unimpaired. In particular, as a result of the composition, according to the invention, of the polyamide moulding compound, a high increase in scattering behaviour (haze) of the moulded articles produced herefrom could be prevented.

The polyamide moulding compounds according to the invention lead to moulded articles with very good mechanical properties.

Thus the test pieces produced from the polyamide moulding compounds according to the invention preferably have a notch impact strength according to Charpy of at least 40 kJ/m$^2$, preferably of at least 50 kJ/m$^2$ and particularly preferred of at least 60 kJ/m$^2$. Determination of the notch impact strength is effected according to ISO 179.

Furthermore, the test pieces produced from the polyamide moulding compound preferably have a tear strength of at least 30 MPa, particularly preferred 40 MPa and/or a breaking elongation of preferably at least 80%, preferably at least 100% and particularly preferred 115%. These mechanical properties are determined respectively according to ISO 527.

It was particularly surprising that test pieces produced from the polyamide moulding compound according to the invention have a haze, measured on 2 mm thick round plates according to ASTM D 1003, of preferably at most 30% and particularly preferred at most 20%.

The test pieces produced from the polyamide moulding compound preferably have a light transmission of at least 75%, preferably of at least 85% and particularly preferred of at least 90%. Here also, the measurement was effected on 2 mm thick round plates according to In a preferred embodiment, the polyamide moulding compound according to the invention has a proportion of 84 to 96% by weight, particularly preferred of 85 to 95% by weight of polyamide, respectively relative to the sum of components a) to c).

It is further preferred that the polyamide moulding compound has from 4 to 16% by weight, particularly preferred from 5 to 15% by weight, respectively relative to the sum of components a) to c), of the functionalised styrene-ethylene/butylene-styrene block copolymer.

The styrene-ethylene/butylene-styrene block copolymer concerns a linear triblock copolymer (SEBS) made of an ethylene/butylene block and two styrene blocks.

A preferred embodiment provides that the proportion of styrene in the functionalised styrene-ethylene/butylene-styrene block copolymer is preferably 20 to 45% by weight, particularly preferred 25 to 40% by weight and very particularly preferred 25 to 35% by weight.

The functionalised styrene-ethylene/butylene-styrene block copolymer preferably has a melt-volume flow rate of 90 to 160 ccm/10 min, particularly preferred of 100 to 150 ccm/10 min and very particularly preferred of 110 to 140 ccm/10 min. The melt-volume flow rate was measured at 275° C. and 5 kg according to ISO 1133.

There should be understood by functionalised styrene-ethylene/butylene-styrene block copolymer, a styrene-ethylene/butylene-styrene block copolymer functionalised by acid modification. This acid modification is effected by grafting with unsaturated carboxylic acids and/or unsaturated carboxylic acid derivatives, preferably a carboxylic acid derivative selected from the group consisting of unsaturated carboxylic acid esters and unsaturated carboxylic acid anhydrides, in particular with an unsaturated carboxylic acid and/or the anhydride thereof selected from the group consisting of acrylic acid, methacrylic acid, alpha-ethyl acrylic acid, maleic acid, fumaric acid, itaconic acid, citraconic acid, aconitic acid, tetrahydrophthalic acid and/or butenylsuccinic acid, i.e. that the styrene-ethylene-butylene/styrene block copolymer comprises grafted unsaturated carboxylic acids and/or unsaturated carboxylic acid derivatives in the molecule. The conditions under which the grafting of the styrene-ethylene/butylene-styrene block copolymer takes place is common knowledge to the person skilled in the art.

The proportion of unsaturated carboxylic acids and/or unsaturated carboxylic acid derivatives in the functionalised styrene-ethylene/butylene-styrene block copolymer is preferably 1.0 to 2.3% by weight, particularly preferred 1.1 to 2.0% by weight, very particular preferred 1.4 to 1.9% by weight.

In a further embodiment, the impact modifier is composed of a functionalised styrene-ethylene-butylene/styrene block copolymer proportion and a non-functionalised styrene-ethylene/butylene-styrene block copolymer proportion. The functionalisation proportion of the functionalised block copolymer and the respective proportions of the functionalised and of the non-functionalised block copolymer are chosen then such that, for the impact modifier in total a functionalisation proportion of preferably 1.0 to 2.3% by weight, particularly preferred 1.1 to 2.0% by weight, very particularly preferred 1.4 to 1.9% by weight, results.

For particular preference, the acid modification of the styrene-ethylene/butylene-styrene block copolymer is effected with maleic acid anhydride, the proportion of maleic acid anhydride of the functionalised
styrene-ethylene/butylene-styrene block copolymer being preferably 1.0 to 2.3% by weight, particularly preferred 1.1 to 2.0% by weight, very particularly preferred 1.4 to 1.9% by weight.

The monomers used in the polyamides concern bis(3-methyl-4-aminocyclohexyl)methane (abbreviated to MACM) with a solidification point of −7 to −1° C. (CAS No. 6864-37-5, trade name, e.g. Laromin C260, manufacturer, e.g. BASF), bis(4-aminocyclohexyl)methane (abbreviated to PACM) with a melting point of 33.5 to 44° C. (CAS No. 1761-71-3, trade name, e.g. Dicykan, manufacturer, e.g. BASF) 1,12-dodecanedioic acid with a melting point of 130° C. (CAS No. 693-23-2, manufacturer, e.g. INVISTA Netherlands B.V.), 1,10-decanedioic acid with a melting point of 134-135° C. (CAS No. 111-20-6, reference source, e.g. Helm AG, Germany) and 1,14-tetradecanedioic acid with a melting point of 126-127° C. (CAS No. 821-38-5, manufacturer, e.g. Cathay Industrial Biotech Ltd., China).

The relative viscosity of the polyamides, measured according to ISO 307 in m-cresol, is 1.50 to 2.2, preferably 1.55 to 1.95, particularly preferred 1.60 to 1.90, very particularly preferred 1.65 to 1.80.

For adjustment of the desired relative viscosity, polyamides of a different relative viscosity can be also mixed in.

The glass transition temperature of the polyamides, measured according to 11357, is 132 to 165° C., preferably 137 to 158° C.

Amongst the copolyamides according to the invention, PA MACM12/PACM 12, PA MACM10/PACM10 and PA MACM14/PACM14 are preferred.

Preferably the proportion of PACM to MACM in the copolyamides is adjusted such that they are amorphous.

In a particularly preferred (co)polyamide PA MACM12/PACM12 according to the invention, the PACM proportion of the diamine is 0 to 100% by mol, preferably 0 to 85% by mol, particularly preferred 0 to 55% by mol, very particularly preferred 0.1 to 50% by mol, the sum of the proportions of both diamine components MACM and PACM resulting in 100% by mol. As diacid, always 100% by mol of dodecanedioic acid is used in the PA MACM12/PACM12.

The proportion of PACM to MACM in the copolyamide MACM12/PACM12 is preferably adjusted such that is amorphous.

With respect to the possible additives, the polyamide moulding compounds according to the invention are not restricted. Rather all current additives for polyamide moulding compounds can be contained here. Preferably, the additives are selected from the group consisting of inorganic and organic stabilisers, in particular antioxidants, antiozonants, light protection agents, UV stabilisers, UV absorbers or UV blockers, lubricants, colourants, marking agents, pigments, carbon black, graphite, titanium dioxide, zinc sulphide, zinc oxide, barium sulphate, photochromic agents, antistatic agents, mould-release agents, optical brighteners, halogen-containing flame retardants, halogen-free flame retardants, natural layer silicates, synthetic layer silicates and mixtures thereof. The additives are preferably contained in a quantity of 0.1 to 6% by weight and particularly preferred of 0.2 to 4% by weight, relative to the total polyamide moulding compound. It is thereby preferred that the quantity of each individual additive is at most 3% by weight.

According to the invention also moulded articles are provided, which are producible from the above-described polyamide moulding compound. The moulded articles are thereby selected preferably from the group consisting of spectacle parts, in particular spectacle frames or spectacle earpieces, in particular for safety goggles, sports goggles or ski goggles, inspection glasses, throughflow meters, bursting discs, containers, housings or housing parts, in particular for shaving apparatus, depilating appliances, measuring devices, infrared keys, mobile phones, transportable playback devices, personal digital assistants (PDA), smart phones or memory media (e.g. USB sticks).

The moulding compounds according to the invention are used for the production of spectacle parts, in particular spectacle frames or spectacle earpieces, in particular for safety goggles, sports goggles or ski goggles, inspection glasses, throughflow meters, bursting discs, containers, housings or housing parts, in particular for shaving apparatus, depilating appliances, measuring devices, infrared keys, mobile phones, transportable playback devices, personal digital assistants (PDA), smart phones or memory media (e.g. USB sticks).

The subject according to the invention is intended to be described in detail with reference to the subsequent examples without wishing to restrict the latter to the specific embodiments shown here.

Production of a Polyamide Moulding Compound According to the Invention

The subsequent description of the production serves for illustration but is not intended to restrict the scope of the invention.

For the production of the polyamide moulding compound, the components are mixed on normal compounding machines, such as e.g. single- or twin-screw extruders or screw kneaders. The components are thereby metered individually into the feed or supplied in the form of a dry blend.

The additives can be used directly or in the form of a master batch. The carrier material of the master batch concerns preferably a polyolefin or a polyamide. Amongst the polyamides, there are suitable in particular PA 6, PA 12, PA 6/12 or polyamide a) itself.

For the dry blend production, the dried granulates and possibly further additives are mixed together. This mixture is homogenised by means of a tumble mixer, drum hoop mixer or tumble drier for 10-40 minutes. In order to avoid absorption of moisture, this can be effected under dried protective gas.

The compounding is effected at set cylinder temperatures of 230° C. to 295° C. In front of the nozzle, a vacuum can be applied or degassing can take place atmospherically. The melt is discharged in strand form, cooled in the water bath at 10 to 80° C. and subsequently granulated. The granulate is dried for 12-24 hours at 80 to 120° C. under nitrogen or in a vacuum to a water content of below 0.1% by weight.

Production of the Test Pieces from the Polyamide Moulding Compounds According to the Invention The test pieces were produced on an injection moulding machine of the company Arburg, Model Allrounder 420 C 1000-250. Rising cylinder temperatures of 230° C. to 295° C. were thereby used. The mould temperature was 80° C. In the case of round plates for the measurement of the light transmission and of the haze, polished moulds were used.

The test pieces were used in a dry state, for this purpose they were stored after injection moulding for at least 48 h at room temperature in a dry environment, i.e. over silica gel.

The measurements were implemented according to the following standards and on the following test pieces made of the polyamide moulding compounds produced according to the above-described method.

Relative viscosity
ISO 307
Granulate
0.5 g in 100 ml m-cresol
Temperature 20° C.
Calculation of the relative viscosity (RV) according to $RV=t/t_0$ following section 11 of the standard.
Glass transition temperature (Tg):
ISO 11357
Granulate
Differential scanning calorimetry (DSC) was implemented at a heating rate of 20 K/min. The centre of the glass transition range which is indicated as Tg was determined according to the "half height" method.
Melt-volume flow rate (MVR)
ISO 1133
Granulate
Temperature 275° C.
Loading 5 kg
Tear strength and breaking elongation:
ISO 527 with a tensile speed of 50 mm/min
ISO test piece, standard: ISO/CD 3167, type A1, 170×20/10×4 mm,
Temperature 23° C.
Notch impact strength according to Charpy:
ISO 179/*eA
ISO test piece, standard: ISO/CD 3167, type B1, 80×10×4 mm,
Temperature 23° C.
*1=not-instrumented, 2=instrumented
Light transmission and haze:
ASTM D 1003
Round plates, thickness 2 mm, radius 37.5 mm
Temperature 23° C.
Measuring device Haze Gard plus of the company Byk Gardner with CIE light type C. The light transmission- and the haze value are indicated in % of the irradiated light quantity.

In the following, firstly the materials used for the comparative examples and examples according to the invention are listed.

Thus table 1 firstly shows the types of polyamides used.

TABLE 1

| Component | Description | Manufacturer |
|---|---|---|
| PA MACM12 | amorphous polyamide MACM12 made of bis(3-methyl-4-aminocyclohexyl)methane and dodecanedioic acid<br>RV 1.70 (measured with 0.5 g in 100 ml m-cresol at 20° C.), glass transition temperature 155° C. | EMS-CHEMIE AG, Switzerland |
| PA MACM12/PACM12 | microcrystalline polyamide PA MACM12/PACM12 made of bis(3-methyl-4-aminocyclohexyl)methane, bis(4-aminocyclohexyl)methane and 1,12-dodecanedioic acid<br>Molar ratio MACM:PACM = 30:70<br>RV 1.80 (measured with 0.5 g in 100 ml m-cresol at 20° C.), glass transition temperature 145° C.<br>Melting point 237° C. | EMS-CHEMIE AG, Switzerland |
| PA PACM12 | microcrystalline polyamide PACM12 made of bis(4-aminocyclohexyl) methane and 1,12-dodecanedioic acid<br>RV 1.80 (measured with 0.5 g in 100 ml m-cresol at 20° C.), glass transition temperature 140° C.<br>Melting point 250° C. | — |

TABLE 1-continued

| Component | Description | Manufacturer |
|---|---|---|
| PA MACMI/12 | amorphous polyamide MACMI/12 in the molar ratio 65/35 made of bis(3-methyl-4-aminocyclohexyl)methane, isophthalic acid and laurinlactam RV 1.56 (measured with 0.5 g in 100 ml m-cresol at 20° C.). Glass transition temperature 160° C. | EMS-CHEMIE AG, Switzerland |
| PA MACMI/ MACMT/12 | amorphous polyamide MACMI/MACMT/12 in the molar ratio 38/38/24 made of bis(3-methyl-4-aminocyclohexyl)methane, isophthalic acid, terephthalic acid and laurinlactam RV 1.53 (measured with 0.5 g in 100 ml m-cresol at 20° C.). Glass transition temperature 194° C. | EMS-CHEMIE AG, Switzerland |
| PA 6I/6T/MACMI/ MACMT/PACMI/ PACMT/12 | amorphous polyamide 6I/6T/MACMI/MACMT/PACMI/PACMT/12 made of 1,6-hexane diamine (38.5% by mol), bis(3-methyl-4-aminocyclohexyl)methane (7.5% by mol), bis(4-aminocyclohexyl)methane (2.7% by mol), isophthalic acid (24.3% by mol) and terephthalic acid (24.3% by mol) and laurinlactam (2.7% by mol) RV 1.62 (measured with 0.5 g in 100 ml m-cresol at 20° C.). Glass transition temperature 159° C. | EMS-CHEMIE AG, Switzerland |
| PA 6I/6T | amorphous copolyamide 6I/6T made of hexamethylene diamine, isophthalic acid and terephthalic acid Molar ratio isophthalic acid:terephthalic acid = 67:33 RV 1.54 (measured with 0.5 g in 100 ml m-cresol at 20° C.). Glass transition temperature 125° C. | EMS-CHEMIE AG, Switzerland |

RV = relative viscosity

In Table 2, the impact modifiers and additives used in the examples and comparative examples are listed.

TABLE 2

| Component | Description | Trade name | Manufacturer |
|---|---|---|---|
| SZM (B1) | styrene-ethylene/butylene-styrene block copolymer with 30% by wt. styrene, grafted with 1.7% by wt. maleic acid anhydride MVR 130 ccm/10 min at 275° C. and 5 kg | Kraton FG1901GT | Kraton Polymers LLC, USA |
| SZM (B2) | copolymer of ethylene and glycidyl methacrylate with 8% by wt. glycidyl methacrylate | Lotader AX 8840 | Arkema GmbH, Germany |
| SZM (B3) | copolymer of styrene and isobutylene | Sibstar 102T | Kaneka Belgium NV, Belgium |
| SZM (B4) | core-shell polymer with butadiene-methylmethacrylate copolymer as core and polystyrene as shell | Paraloid BTA-753 | Rohm and Haas, USA |
| SZM (B5) | polystyrene-polybutadiene-polymethylmethacrylate block copolymer | Clearstrength E920 | Arkema GmbH, Germany |
| SZM (B6) | core-shell polymer with butadiene-styrene copolymer as core and polymethylmethacrylate as shell | Paraloid EXL-3600 | Rohm and Haas, USA |
| SZM (B7) | olefin copolymer of ethylene and octene-1, grafted with maleic acid anhydride | Paraloid EXL-3808 | Rohm and Haas, USA |
| SZM (B8) | copolymer of ethylene, acrylester and maleic acid anhydride with 1.3% by wt. maleic acid anhydride | Lotader 4700 | Arkema GmbH, Germany |
| SZM (B9) | olefin copolymer of ethylene and octene-1, grafted with 0.5% by wt. maleic acid anhydride | Fusabond MN493D | DuPont de Nemours, USA |
| SZM (B10) | olefin copolymer of ethylene and propylene, grafted with maleic acid anhydride | Exxelor VA 1801 | Exxon Mobil Chemicals, USA |
| stabiliser | N,N'-bis-2,2,6,6-tetramethyl-4-piperidiny1-1,3-benzene dicarboxamide | Nylostab S-EED P | Clariant Corporation, USA |
| lubricant | calcium salt of octadecanoic acid and higher fatty acids with 16-18 C atoms | Calcium stearate S | FACI S.p.A., Italy |
| carbon black master batch | colour black master batch on polyethylene basis with 40% by wt. colour black | Euthylen Schwarz 00-6005 C4 | BASF Color Solutions, Germany |

In Table 3, polyamide moulding compounds according to the invention are compared with polyamide moulding compounds known from the state of the art, with respect to the mechanical properties (tear strength, breaking elongation and notch impact strength according to Charpy) and also the optical properties (light transmission, haze).

When using 3% by weight of the impact modifier according to the invention (comparative example 7), too low a notch impact strength of the polyamide moulding compound results, whereas, at 20% by weight of the impact modifier according to the invention (comparative example 8), the haze value is too high.

TABLE 3

|  |  | Examples |  |  |  |  | Comparative examples |  |  |
| --- | --- | --- | --- | --- | --- | --- | --- | --- | --- |
|  | Unit | 1 | 2 | 3 | 4 | 5 | 6 | 7 | 8 |
| Components |  |  |  |  |  |  |  |  |  |
| PA MACM12 | % by wt. | 89.6 | 87.6 | — | — | — | 99.5 | 97.6 | 79.6 |
| PA MACM12/PACM12 | % by wt. | — | — | 89.6 | — | — | — | — | — |
| PA PACM12 | % by wt. | — | — | — | 89.6 | 87.6 | — | — | — |
| SZM (B1) | % by wt. | 10 | 12 | 10 | 10 | 12 | — | 3 | 20 |
| stabiliser | % by wt. | 0.1 | 0.1 | 0.1 | 0.1 | 0.1 | 0.1 | 0.1 | 0.1 |
| lubricant | % by wt. | 0.3 | 0.3 | 0.3 | 0.3 | 0.3 | 0.3 | 0.3 | 0.3 |
| Tests |  |  |  |  |  |  |  |  |  |
| tear strength | MPa | 43 | 44 | 44 | 42 | 41 | 45 | 45 | 39 |
| breaking elongation | % | 126 | 131 | 121 | 116 | 119 | 150 | 146 | 155 |
| notch impact Charpy 23° C. | kJ/m$^2$ | 70 | 70 | 80 | 76 | 78 | 13 | 17 | 89 |
| light transmission | % | 92.5 | 92.3 | 85.6 | 85.7 | 85.4 | 94 | 92.8 | 78.2 |
| haze | % | 13 | 15 | 22 | 25 | 26 | 1 | 8 | 47 |

SZM = impact modifier

The polyamide moulding compounds according to the invention with 10 or 12% by weight of the impact modifier according to the invention (example 1 to 5) show very good notch impact values and at the same time good haze values.

In Table 4, polyamide moulding compounds made of PA MACM12 with various impact modifiers, not according to the invention, are examined with respect to the mechanical and optical properties.

TABLE 4

|  |  | Comparative examples |  |  |  |  |  |  |  |  |  |
| --- | --- | --- | --- | --- | --- | --- | --- | --- | --- | --- | --- |
|  | Unit | 9 | 10 | 11 | 12 | 13 | 14 | 15 | 16 | 17 | 18 |
| Components |  |  |  |  |  |  |  |  |  |  |  |
| PA MACM12 | % by wt. | 87.6 | 89.6 | 89.6 | 89.6 | 89.6 | 89.6 | 89.6 | 89.6 | 89.6 | 89.6 |
| SZM (B2) | % by wt. | 12 | 10 | — | — | — | — | — | — | — | — |
| SZM (B3) | % by wt. | — | — | 10 | — | — | — | — | — | — | — |
| SZM (B4) | % by wt. | — | — | — | 10 | — | — | — | — | — | — |
| SZM (B5) | % by wt. | — | — | — | — | 10 | — | — | — | — | — |
| SZM (B6) | % by wt. | — | — | — | — | — | 10 | — | — | — | — |
| SZM (B7) | % by wt. | — | — | — | — | — | — | 10 | — | — | — |
| SZM (B8) | % by wt. | — | — | — | — | — | — | — | 10 | — | — |
| SZM (B9) | % by wt. | — | — | — | — | — | — | — | — | 10 | — |
| SZM (B10) | % by wt. | — | — | — | — | — | — | — | — | — | 10 |
| stabiliser | % by wt. | 0.1 | 0.1 | 0.1 | 0.1 | 0.1 | 0.1 | 0.1 | 0.1 | 0.1 | 0.1 |
| lubricant | % by wt. | 0.3 | 0.3 | 0.3 | 0.3 | 0.3 | 0.3 | 0.3 | 0.3 | 0.3 | 0.3 |
| Tests |  |  |  |  |  |  |  |  |  |  |  |
| tear strength | MPa | 41 | 39 | 38 | 43 | 47 | 44 | 43 | 40 | 45 | 47 |
| breaking elongation | % | 91 | 30 | 21 | 89 | 131 | 114 | 120 | 79 | 133 | 138 |
| notch impact Charpy 23° C. | kJ/m$^2$ | 39 | 23 | 8 | 21 | 16 | 28 | 55 | 41 | 54 | 27 |
| light transmission | % | 82.0 | 83.6 | 88.7 | 71.5 | 84.2 | 76.1 | 66.4 | 60.5 | 60.8 | 69.5 |
| haze | % | 41 | 38 | 61 | 62 | 68 | 83 | 98 | 96 | 99 | 99 |

The impact modifiers used in the polyamide moulding compounds of the comparative examples 9 to 18, in comparison with the impact modifier according to the invention (examples 1 to 5), improve the notch impact strength to a lesser extent and furthermore also lead to an extremely high increase in haze.

The impact modifier B2 (comparative examples 9 and 10) concerns ethylene-glycidyl-methacrylate as recommended in the state of the art (EP 1 369 447 A1). However, compared with the polyamide moulding compounds according to the invention of examples 2 and 1, it leads to an unbalanced combination of notch impact strength and haze.

The impact modifiers B7, B9 and B10 concern likewise impact modifiers recommended in EP 1 369 447 A1, namely polyethylenes or polypropylenes modified with maleic acid anhydride. However, they all lead to extremely high haze values.

In Table 5, polyamide moulding compounds with polyamide components, as are used in the state of the art, are examined with respect to the mechanical and optical properties.

TABLE 5

| Components | Unit | Comparative examples | | | |
| --- | --- | --- | --- | --- | --- |
| | | 19 | 20 | 21 | 22 |
| PA MACMI/12 | % by wt. | 89.6 | — | — | — |
| PA MACMI/MACMT/12 | % by wt. | — | 89.6 | — | — |
| PA 6I/6T/MACMI/MACMT/PACMI/PACMT/12 | % by wt. | — | — | 89.6 | — |
| PA 6I/6T | % by wt. | — | — | — | 89.6 |
| SZM (B1) | % by wt. | 10 | 10 | 10 | 10 |
| stabiliser | % by wt. | 0.1 | 0.1 | 0.1 | 0.1 |
| lubricant | % by wt. | 0.3 | 0.3 | 0.3 | 0.3 |
| Tests | | | | | |
| tear strength | MPa | 52 | 58 | 62 | 62 |
| breaking elongation | % | 92 | 37 | 62 | 154 |
| notch impact Charpy 23° C. | kJ/m$^2$ | 47 | 38 | 77 | 99 |
| light transmission | % | 52.2 | 46.0 | 21.9 | 21.6 |
| haze | % | 83 | 96 | 99 | 98 |

Comparative examples 19 to 22 show the effect of the impact modifier B1 according to the invention in combination with polyamides not according to the invention. In these polyamides, the impact modifier according to the invention even leads to polyamide moulding compounds which have unusably high haze values and extremely low light transmission values.

In Table 6, a polyamide moulding compound according to the invention with a proportion of carbon black is compared with a polyamide moulding compound from the state of the art which does not have the impact modifier according to the invention (comparative example 25), with respect to the mechanical properties and displays thereby both an improvement in breaking elongation and a great improvement in notch impact strength (examples 23 and 24).

TABLE 6

| Components | Unit | Examples | | Comparative examples |
| --- | --- | --- | --- | --- |
| | | 23 | 24 | 25 |
| PA MACM12 | % by wt. | 87.6 | 87.6 | 97.6 |
| SZM (B1) | % by wt. | 10 | 12 | — |
| stabiliser | % by wt. | 0.1 | 0.1 | 0.1 |
| lubricant | % by wt. | 0.3 | 0.3 | 0.3 |
| carbon black masterbatch | % by wt. | 2 | 2 | 2 |
| Tests | | | | |
| tear strength | MPa | 43 | 43 | 45 |
| breaking elongation | % | 120 | 120 | 115 |
| notch impact Charpy 23° C. | kJ/m$^2$ | 57 | 66 | 10 |

The invention claimed is:

1. A polyamide moulding compound comprising
   a) 82 to 96% by weight, relative to the sum of components a) to c), of at least one polyamide selected from the group consisting of
   polyamide (PA MACM12) made of bis(3-methyl-4-aminocyclohexyl)methane and dodecanedioic acid,
   polyamide (PA PACM12) made of bis(4-aminocyclohexyl)methane and dodecanedioic acid,
   polyamide (PA MACM10) made of bis(3-methyl-4-aminocyclohexyl)methane and decanedioic acid,
   polyamide (PA PACM10) made of bis(4-aminocyclohexyl)methane and decanedioic acid,
   polyamide (PA MACM14) made of bis(3-methyl-4-aminocyclohexyl)methane and tetradecanedioic acid,
   polyamide (PA PACM14) made of bis(4-aminocyclohexyl)methane and tetradecanedioic acid and
   mixtures and copolyamides thereof,
   b) 4 to 18% by weight, relative to the sum of components a) to c), of a functionalised styrene-ethylene/butylene-styrene block copolymer as impact modifier and
   c) 0 to 8% by weight, relative to the sum of components a) to c), of further additives,
   components a) to c) adding up to 100% by weight;
   wherein test pieces produced from the polyamide moulding compound have a notch impact strength according to Charpy, measured according to ISO 179, of at least 40 kJ/m$^2$.

2. The polyamide moulding compound according to claim 1,
   wherein test pieces produced from the polyamide moulding compound have a haze, measured on 2 mm thick round plates according to ASTM D 1003, of at most 30%.

3. The polyamide moulding compound according to claim 1,
   wherein test pieces produced from the polyamide moulding compound have a tear strength of at least 30 MPa and a breaking elongation of at least 80% respectively measured according to ISO 527.

4. The polyamide moulding compound according to claim 1,
   wherein test pieces produced from the polyamide moulding compound have a light transmission of at least 75%, measured on 2 mm thick round plates according to ASTM D 1003.

5. The polyamide moulding compound according to claim 1,
   wherein the polyamide moulding compound comprises from 84 to 96% by weight, respectively relative to the sum of components a) to c), of the polyamide.

6. The polyamide moulding compound according to claim 1, wherein the polyamide moulding compound comprises from 4 to 16% by weight, respectively to the sum of components a) to c), of the functionalised styrene-ethylene /butylene-styrene block copolymer.

7. The polyamide moulding compound according to claim 1,
wherein the functionalised styrene-ethylene/butylene-styrene block copolymer has a proportion of styrene of 20 to 45% by weight.

8. The polyamide moulding compound according to claim 1,
wherein the functionalised styrene-ethylene/butylene-styrene block copolymer has a melt-volume flow rate of 90 to 160 ccm/10 min, respectively measured at 275° C. and 5 kg according to ISO 1133.

9. The polyamide moulding compound according to claim 1,
wherein the functionalised styrene-ethylene/butylene-styrene block copolymer has a functionalisation proportion of 1.0 to 2.3% by weight.

10. A polyamide moulding compound comprising
a) 82 to 96% by weight, relative to the sum of components a) to c), of at least one polyamide selected from the group consisting of
polyamide (PA MACM12) made of bis(3-methyl-4-aminocyclohexyl)methane and dodecanedioic acid,
polyamide (PA PACM12) made of bis(4-aminocyclohexyl)methane and dodecanedioic acid,
polyamide (PA MACM10) made of bis(3-methyl-4-aminocyclohexyl)methane and decanedioic acid,
polyamide (PA PACM10) made of bis(4-aminocyclohexyl)methane and decanedioic acid,
polyamide (PA MACM14) made of bis(3-methyl-4-aminocyclohexyl)methane and tetradecanedioic acid,
polyamide (PA PACM14) made of bis(4-aminocyclohexyl)methane and tetradecanedioic acid and
mixtures and copolyamides thereof,
b) 4 to 18% by weight, relative to the sum of components a) to c), of a functionalised styrene-ethylene/butylene-styrene block copolymer as impact modifier and
c) 0 to 8% by weight, relative to the sum of components a) to c), of further additives,
components a) to c) adding up to 100% by weight;
wherein the functionalised styrene-ethylene/butylene-styrene block copolymer is grafted at least partially with unsaturated carboxylic acids and unsaturated carboxylic acid derivatives.

11. The polyamide moulding compound according to claim 1,
wherein the additives are selected from the group consisting of inorganic and organic stabilisers, antioxidants, antiozonants, light protection agents, UV stabilisers, UV absorbers or UV blockers, lubricants, colourants, marking agents, pigments, carbon black, graphite, titanium dioxide, zinc sulphide, zinc oxide, barium sulphate, photochromic agents, antistatic agents, mould-release agents, optical brighteners, halogen-containing flame retardants, halogen-free flame retardants, natural layer silicates, synthetic layer silicates and mixtures thereof and are contained in a quantity of 0.1 to 6% by weight relative to the total polyamide moulding compound, the quantity of each individual additive being at most 3% by weight.

12. A moulded article comprising a polyamide moulding compound according to claim 1.

13. The moulded article according to claim 12,
wherein the moulded article is selected from the group consisting of spectacle parts, spectacle earpieces or spectacle earpieces, for safety goggles, sports goggles or ski goggles, inspection glasses, throughflow meters, bursting discs, containers, housings or housing parts, shaving apparatus, depilating appliances, measuring devices, infrared keys, mobile phones, transportable playback devices, personal digital assistants, (PDA), smart phones, and memory media.

14. A method for the production of spectacle parts, spectacle frames or spectacle earpieces, safety goggles, sports goggles or ski goggles, inspection glasses, throughflow meters, bursting discs, containers, housings or housing parts, shaving apparatus, depilating appliances, measuring devices, infrared keys, mobile phones, transportable playback devices, personal digital assistants, (PDA), smart phones, or memory media, comprising utilizing the moulding compounds according to claim 1 in their production.

15. The polyamide moulding compound according to claim 1,
wherein test pieces produced from the polyamide moulding compound have a notch impact strength according to Charpy, measured according to ISO 179, of at least 50kJ/m$^2$.

16. The polyamide moulding compound according to claim 3,
wherein test pieces produced from the polyamide moulding compound have a tear strength of at least 40 MPa and a breaking elongation of at least 80%, respectively measured according to ISO 527.

17. The polyamide moulding compound according to claim 16,
wherein test pieces produced from the polyamide moulding compound have a tear strength of at least 40 MPa and a breaking elongation of at least 100%, respectively measured according to ISO 527.

18. The polyamide moulding compound according to claim 4,
wherein test pieces produced from the polyamide moulding compound have a light transmission of at least 85%, measured on 2 mm thick round plates according to ASTM D 1003.

19. The polyamide moulding compound according to claim 5,
wherein the polyamide moulding compound comprises from 85 to 95% by weight, respectively relative to the sum of components a) to c), of the polyamide.

20. A polyamide moulding compound comprising
a) 82 to 96% by weight, relative to the sum of components a) to c), of at least one polyamide selected from the group consisting of
polyamide (PA MACM12) made of bis(3-methyl-4-aminocyclohexyl)methane and dodecanedioic acid,
polyamide (PA PACM12) made of bis(4-aminocyclohexyl)methane and dodecanedioic acid,
polyamide (PA MACM10) made of bis(3-methyl-4-aminocyclohexyl)methane and decanedioic acid,
polyamide (PA PACM10) made of bis(4-aminocyclohexyl)methane and decanedioic acid,
polyamide (PA MACM14) made of bis(3-methyl-4-aminocyclohexyl)methane and tetradecanedioic acid,
polyamide (PA PACM14) made of bis(4-aminocyclohexyl)methane and tetradecanedioic acid and
mixtures and copolyamides thereof, b) 4 to 18% by weight, relative to the sum of components a) to c), of a functionalised styrene-ethylene/butylene-styrene block copolymer as impact modifier and c) 0 to 8% by weight, relative to the sum of components a) to c), of further additives, components a) to c) adding up to 100% by weight;

wherein test pieces produced from the polyamide moulding compound have a haze, measured on 2 mm thick round plates according to ASTM D 1003, of at most 30%.

* * * * *